Dec. 12, 1939.   W. R. ROYCROFT   2,183,032
CONTROL MECHANISM
Filed April 6, 1938

INVENTOR
W. R. ROYCROFT
BY Emery Robinson
ATTORNEY

Patented Dec. 12, 1939

2,183,032

UNITED STATES PATENT OFFICE 2,183,032

CONTROL MECHANISM

Walter R. Roycroft, Ozone Park, N. Y., assignor to Western Electric Company, Incorporated, New York, N. Y., a corporation of New York Application April 6, 1938, Serial No. 200,371

4 Claims. (Cl. 74—526)

This invention relates to control mechanisms and more particularly to valve controlling mechanism provided with safety devices for preventing accidental operation thereof.

It is an object of the present invention to provide a relatively safe control mechanism.

In accordance with one embodiment of the invention, as applied to valves which might be inadvertently operated, there is provided a valve having a lever for operating the valve, which lever terminates in a treadle by means of which the valve may be operated. A spring pressed pivoted lever is mounted in the treadle, which, when the treadle is released, is urged by the spring to assume a position which will prevent operation of the treadle until the pivoted lever is moved back to its inoperative position.

Figure 1:
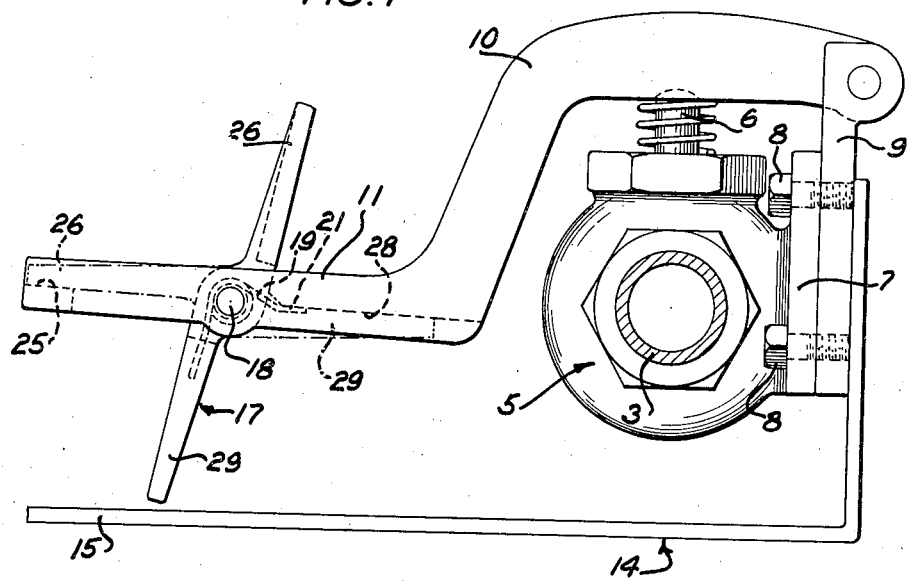
Figure 2:
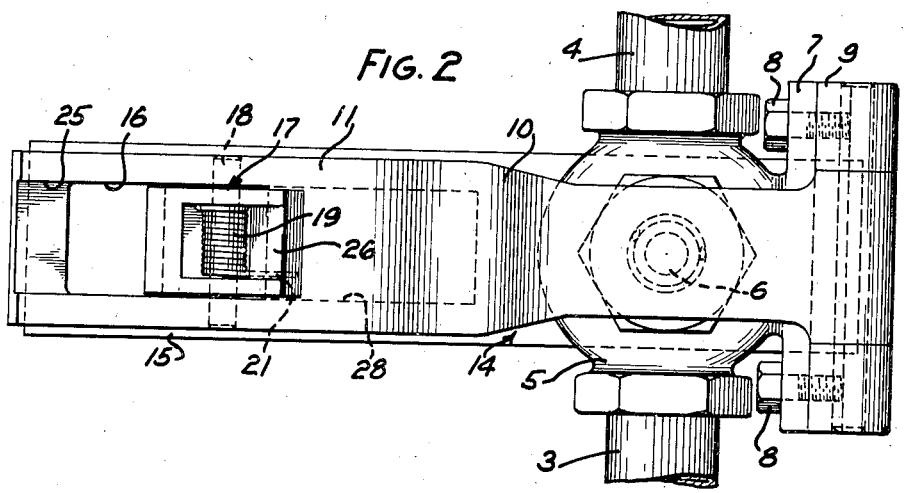

A better understanding of the details of the invention may be had by reference to the following detailed description, when considered in conjunction with the accompanying drawing, wherein Fig. 1 is a side elevational view of a valve having an operating mechanism made in accordance with the present invention, and Fig. 2 is a plan view of the structure shown in Fig. 1.

Referring to the drawing, wherein like reference characters designate the same parts throughout the several views, the numeral 5 designates generally a valve casing having a suitable actuating plunger 6 for opening the valve ports (not shown) to permit the flow of fluid from a pipe 3 to a pipe 4 upon the depression of the plunger. Formed integrally with the valve casing 5 (Figs. 1 and 2) is a mounting plate 7 to which there is affixed, by means of bolts 8, a hinge plate 9 for pivotally supporting a valve actuating lever 10. The lever 10 terminates in a treadle 11, and upon movement of the treadle downwardly (Fig. 1), the valve ports will be opened. There is suitably secured to the hinge plate 9 an L-shaped member 14 having a portion 15 which extends horizontally beneath the treadle 11. The treadle 11 has a rectangular aperture formed therein, as shown at 16, for receiving a pivoted lever 17 mounted upon a pivot pin 18 and having a coil spring engaging it at 19. The coil spring 19 surrounds the pivot pin and has one end abutting the underside of the treadle at 21. The left end of the treadle (Figs. 1 and 2) is recessed, as shown at 25, for receiving the end 26 of the pivoted lever and the right end is recessed, as shown at 28, for receiving the end 29 of the pivoted lever so as to present a substantially flat smooth upper surface upon which the foot of an operator may rest while he is using the mechanism.

From the foregoing, it will be apparent that the spring 19 normally urges the lever 17 to assume the position shown in Figs. 1 and 2, whereby when the treadle 11 is released, the lever 17 will move to the position shown and prevent operation of the treadle due to the engagement of the lower end of the lever with the portion 15 of the member 14. The lever 17 will assume the position shown in Figs. 1 and 2 and will stay in that position until it is rocked counter-clockwise about the pivot pin 18 against the pressure exerted by the spring 19, thereby preventing accidental operation of the valve. It will be apparent that the release of the lever 17 from its locked position is accomplished by the same general movement as the operation of the lever 10; that is, the operator, when placing his foot upon the lever 10, would, in the same general motion, force the portion 26 of the lever 17 into its recess, thus releasing the portion 29, and when the operator raises his foot, the locking lever immediately returns to the position shown in full lines on the drawing.

Although a specific embodiment of the invention has been described hereinbefore, it will be understood that it is subject to modifications and is to be limited only by the scope of the appended claims.

What is claimed is:

1. A control mechanism for a valve comprising a treadle pivotally supported and positioned to move a plunger of a normally closed valve to open the valve, an element supported by a pivot carried by a substantially horizontal portion of the treadle having a stop portion to locate the element in normal position, an abutting member positioned to be engaged by the element to render the treadle ineffective to move the plunger when the element is in normal position, and means to force the element about its pivot beyond its vertical center and into its normal position in engagement with the stop portion to condition the treadle against accidental movement.

2. A control mechanism for a valve comprising a treadle pivotally supported and positioned to move a plunger of a normally closed valve to open the valve, an element supported by a pivot carried by a substantially horizontal portion of the treadle having a stop portion to locate the element in normal position, an abutting member positioned to be engaged by the element to render the treadle ineffective to move the plunger when the element is in normal position, and means to force the element about its pivot beyond its vertical center and into its normal position in engagement with the stop portion to condition the treadle against movement in one direction to move the plunger until force is applied in a direction transverse to the direction required to move the treadle to move the element away from its normal position beyond the center line.

3. A control mechanism for a valve comprising a treadle pivotally supported and positioned to move a plunger of a normally closed valve to open the valve, an element having substantially diametrically opposed extensions supported by a pivot carried by a substantially horizontal portion of the treadle having a stop portion to engage one of the extensions to locate the element in normal position, an abutting member positioned to be engaged by one of the extensions to render the treadle ineffective to move the plunger when the element is in normal position, and means to force the element about its pivot beyond its vertical center and into its normal position in engagement with the stop portion to condition the treadle against movement by a force applied against the element and treadle in a single direction.

4. A control mechanism for a valve comprising a treadle pivotally supported and positioned to move a plunger of a normally closed valve to open the valve, an element supported by a pivot carried by a substantially horizontal portion of the treadle having a stop portion to locate the element in normal position, an abutting member positioned to be engaged by the element to render the treadle ineffective to move the plunger when the element is in normal position, and means to force the element about its pivot beyond its vertical center and into its normal position in engagement with the stop member to condition the treadle against movement other than by application of force in one direction to move the element free of the abutting member and by a subsequent application of force in a transverse direction to the treadle.

WALTER R. ROYCROFT.